(No Model.)

V. H. HALLOCK.
END THRUST PAD FOR PROPELLER AND OTHER SHAFTS.

No. 315,776. Patented Apr. 14, 1885.

WITNESSES:
Otto Hufeland
William Miller

INVENTOR
Valentine H. Hallock
BY
Van Santvoord & Hauff
his ATTORNEYS

N. PETERS. Photo-Lithographer, Washington, D. C.

UNITED STATES PATENT OFFICE.

VALENTINE H. HALLOCK, OF QUEENS, NEW YORK.

END-THRUST PAD FOR PROPELLER AND OTHER SHAFTS.

SPECIFICATION forming part of Letters Patent No. 315,776, dated April 14, 1885.

Application filed January 22, 1885. (No model.)

*To all whom it may concern:*

Be it known that I, VALENTINE H. HALLOCK, a citizen of the United States, residing at Queens, in the county of Queens and State of New York, have invented new and useful Improvements in End-Thrust Pads for Propeller and other Shafts, of which the following is a specification.

The object of this invention is to counteract the end-thrust of shafts—such, for instance, as propeller-shafts.

The invention consists in the combination, with the shaft and with one of its pillow-blocks, of a series of water-packed pads (two or more) secured to the pillow-block, and a flange which is securely fastened on the shaft and bears against the outer faces of said pads. With the pads is combined a force-pump with an air-chamber and a graduated valve, so that a uniform and yielding water-pressure can be maintained in the pads.

Figure 1:
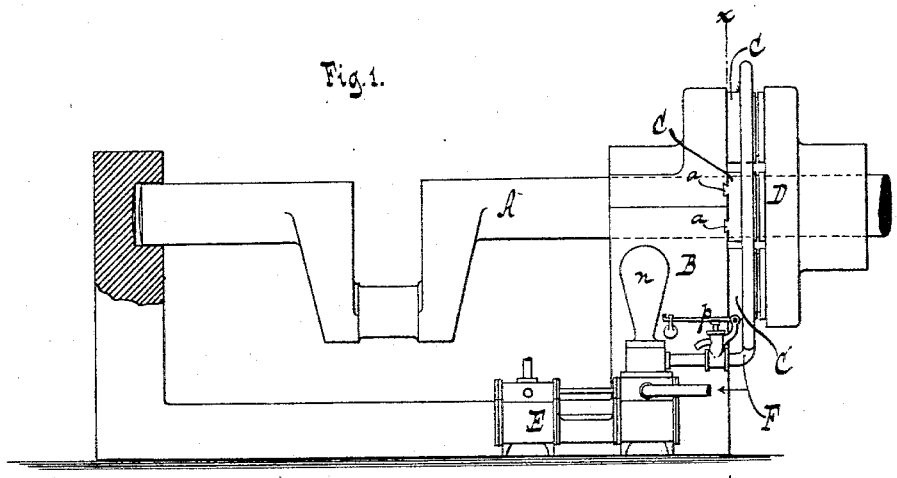
Figure 2:
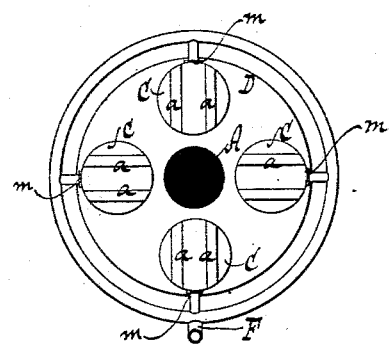
Figure 3:
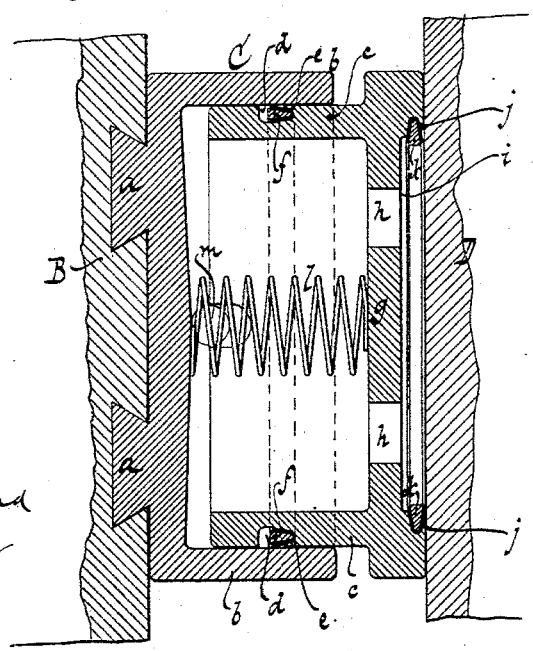

In the accompanying drawings, Figure 1 represents a side view of a shaft provided with my anti-thrust pads. Fig. 2 is a transverse section in the plane $x$ $x$, Fig. 1. Fig. 3 is a section of one of my pads on a larger scale than the previous figures.

Similar letters indicate corresponding parts.

In the drawings, the letter A designates a shaft—such, for instance, as a propeller-shaft—and B is a pillow-block, which forms one of the bearings for this shaft. On the face of this pillow-block are secured a series of pads, C, which bear against a flange, D, fastened on the shaft.

In the example represented by the drawings four pads are shown; but the number may be decreased or increased according to circumstances.

The pads shown in the drawings are provided with dovetailed ribs $a$ $a$, which engage with corresponding grooves in the face of the pillow-block (best seen in Fig. 3;) but other means may be used for retaining the pads in position on the pillow-block, and I do not want to restrict myself to the exact means shown. Each of the pads consists of two cylinders, $b$ $c$, the cylinder $b$ being bored out to receive the cylinder $c$. In the cylinder $c$ is a groove or recess, $d$, into which is placed the leather packing $e$, and a ring, $f$, serves to retain this packing in the recess. When the pad is charged with water under pressure, the outer section of the packing $e$ is forced against the inner surface of the cylinder $b$ by the pressure of the water, and leakage at that point is prevented. The head $g$ of the cylinder $c$ is provided with holes $h$ and with a recess, $i$, which contains the leather packing $j$, said packing being constructed like the packing $e$ and being retained in position by the ring $k$. When the pad is charged with water under pressure, the outer face of the head $g$ is forced up against the face of the flange D on the shaft and leakage is prevented by the packing $j$, while at the same time comparatively little friction is produced between the pads and the flange. In order to keep the head $g$ in contact with the flange D when the pad is not charged with water, I have placed into each pad a spring, $l$.

The pads are supplied with water by means of a force-pump, E, which connects by means of a pipe, F, with the supply-openings $m$ of all the pads. The pump E is provided with an air-chamber, $n$, and with a safety-valve, $p$, which is set to the maximum pressure required in the pads. When the pump is set in operation, all the pads are charged with water, and when the pressure reaches the desired limit the water blows off through the safety-valve. At the same time the air in the upper portion of the air-chamber becomes compressed and acts as an elastic cushion, whereby the pressure in the pads is rendered yielding to some extent, and the friction between the pads and the flange D is reduced to a minimum. By these means the end-thrust of the shaft A is sustained by the water-packed pads C, and a large percentage of power is saved.

If desired, an additional set of pads may be applied to counteract the end-thrust of the shaft in the opposite direction.

What I claim as new, and desire to secure by Letters Patent, is—

1. The combination, substantially as hereinbefore described, with the shaft A and the pillow-block B, of a series of water-packed pads, C, secured to the pillow-block, and the flange D, which is securely fastened on the shaft in position to bear against the pads.

2. The combination, substantially as hereinbefore described, with the shaft A, the pillow-block B, the pads C, and the flange D, of the force-pump E, for injecting into all the pads the requisite supply of water.

3. The combination, substantially as hereinbefore described, with the shaft A, the pillow-block B, the pads C, and the flange D, of the force-pump E, its air-chamber $a$, and safety-valve $p$.

In testimony whereof I have hereunto set my hand and seal in the presence of two subscribing witnesses.

VALENTINE H. HALLOCK. [L. S.]

Witnesses:
 E. F. KASTENHUBER,
 A. FABER DU FAUR, Jr.